United States Patent
Zhang et al.

(10) Patent No.: US 12,467,205 B2
(45) Date of Patent: Nov. 11, 2025

(54) PROCESS FOR PREPARING A COATED PAPER ARTICLE

(71) Applicants: Rohm and Haas Company, Collegeville, PA (US); Dow Global Technologies LLC, Midland, MI (US)

(72) Inventors: Xiangyi Zhang, Phoenixville, PA (US); John A. Roper, III, Midland, MI (US); Andrew Hejl, Lansdale, PA (US); Brian R. Einsla, Collegeville, PA (US); Matthew Carter, Bala Cynwyd, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 128 days.

(21) Appl. No.: 18/567,147

(22) PCT Filed: Jun. 21, 2022

(86) PCT No.: PCT/US2022/034204
§ 371 (c)(1),
(2) Date: Dec. 5, 2023

(87) PCT Pub. No.: WO2023/009242
PCT Pub. Date: Feb. 2, 2023

(65) Prior Publication Data
US 2024/0287743 A1   Aug. 29, 2024

Related U.S. Application Data

(60) Provisional application No. 63/225,602, filed on Jul. 26, 2021.

(51) Int. Cl.
| | | |
|---|---|---|
| D21H 19/12 | (2006.01) | |
| C08F 218/08 | (2006.01) | |
| C09D 5/02 | (2006.01) | |
| C09D 131/04 | (2006.01) | |
| D21H 23/52 | (2006.01) | |

(52) U.S. Cl.
CPC ......... D21H 19/12 (2013.01); C08F 218/08 (2013.01); C09D 5/022 (2013.01); C09D 131/04 (2013.01); D21H 23/52 (2013.01); C08F 2800/20 (2013.01)

(58) Field of Classification Search
CPC ........ D21H 19/12; D21H 21/16; D21H 27/10; D21H 19/20; D21H 23/52; C08F 218/08; C08F 2800/20; C09D 5/022; C09D 131/04
See application file for complete search history.

(56) References Cited

U.S. PATENT DOCUMENTS

| | | | |
|---|---|---|---|
| 8,647,427 B2 | 2/2014 | Lazarus et al. | |
| 10,414,938 B2 * | 9/2019 | Veling | D21H 17/37 |
| 10,793,740 B2 * | 10/2020 | Veling | D21H 19/56 |
| 10,837,141 B2 * | 11/2020 | Seyffer | D21H 19/22 |
| 2007/0232743 A1 * | 10/2007 | Laviolette | D21H 19/42 |
| | | | 524/451 |
| 2010/0112226 A1 * | 5/2010 | Weilbacher | D21H 23/48 |
| | | | 427/372.2 |
| 2017/0029651 A1 * | 2/2017 | Veling | C09D 131/04 |
| 2018/0142416 A1 * | 5/2018 | Seyffer | D21H 19/12 |
| 2020/0269554 A1 * | 8/2020 | Noda | D21H 19/82 |
| 2024/0133120 A1 * | 4/2024 | Johnson | D21H 23/66 |

FOREIGN PATENT DOCUMENTS

| | | | | |
|---|---|---|---|---|
| EP | 2894253 A1 * | 7/2015 | | D21H 27/10 |
| EP | 2894253 B1 * | 12/2017 | | D21H 27/10 |
| EP | 3298199 B1 * | 7/2019 | | D21H 27/18 |
| EP | 3733406 A1 * | 11/2020 | | B32B 27/18 |
| EP | 4194515 A1 * | 6/2023 | | C09D 11/12 |
| JP | 2024530589 A * | 8/2024 | | D21H 23/52 |
| WO | WO-2025133894 A1 * | 6/2025 | | |

* cited by examiner

*Primary Examiner* — Jose A Fortuna
(74) *Attorney, Agent, or Firm* — Reid S. Willis

(57) ABSTRACT

The present invention relates to a method comprising the steps of applying to a paper or paperboard substrate an aqueous dispersion of polymer particles which comprise structural units of a vinyl ester, vinyl alcohol, and an acrylate monomer, then drying the composition. The method provides a coating that has oil and grease resistance, mineral oil barrier performance, and beat scalability.

10 Claims, No Drawings

PROCESS FOR PREPARING A COATED PAPER ARTICLE

BACKGROUND OF THE INVENTION

The present invention relates to a process for preparing a coated paper article, more particularly, a paper or paperboard coated with a partially hydrolyzed poly(vinyl ester-co-acrylate). Paper and paperboard are increasingly used in packaging applications as sustainable alternatives to plastic packaging due to the renewability and biodegradability of paper. In many applications, paper and paperboard need to be coated with a barrier material to reduce the penetration of oil, grease, moisture, and oxygen through these substrates. Achieving oil and grease resistance (OGR) is essential for paper and paperboard packages used in food service applications such as sandwich wraps, popcorn bags, and bakery boxes. Barrier coatings designed for these applications are typically used to block the oil from saturating the underlying paper substrate, which can alter the material's appearance and decrease the structural integrity of the packaging.

Conventional OGR papers are treated with perfluorocarbon additives, which, while highly effective barrier materials, are under intensive regulatory scrutiny. Extruded plastic films such as polyethylene have also been used to coat paper and paperboard and have been found to exhibit good barrier performance. However, extrusion coatings require off-machine application and create films that are unnecessarily thick, thereby increasing cost and limiting the repulpability and recyclability of these coated paper products.

Aqueous dispersion coatings are environmentally friendly alternatives to fluorochemical and polyethylene coatings and they can be applied at low coat weights to enable improved repulpability and recyclability of the paper packages. Synthetic latexes based on acrylics, styrene-acrylic (SA), and styrene-butadiene (SB) polymers are the most commonly used materials in barrier coating applications. These compositions can provide excellent OGR to the paper and paperboard substrates but are often deficient in other coating properties that are important to the production and application of paper products, such as flexibility (or foldability), block resistance, and heat sealability. Poly(vinyl acetate) (PVAc) dispersions are a class of synthetic latex that have been traditionally used in coating compositions in the paper industry. These latexes provide advantages such as low cost, heat and light stability, glueability, and blister resistance over SA and SB type binders. However, PVAc does not provide good barrier properties required for packaging applications. It would therefore be an advance in the art of coated paper and paperboard articles to develop a cost-effective and environmentally friendly article with acceptable oil and grease resistance and barrier properties.

SUMMARY OF THE INVENTION

The present invention addresses a need in the art by providing a method comprising the steps of applying a composition onto a paper or paperboard substrate, then drying the composition to form a substrate superposed with a film having a dry coat weight in the range of from 1 $g/m^2$ to 20 $g/m^2$;
wherein the composition comprises an aqueous dispersion of copolymer particles comprising, based on the weight of the copolymer particles, a) from 40 to 96 weight percent structural units of a vinyl ester; b) from 2 to 50 weight percent structural units of vinyl alcohol; and c) from 0.5 to 30 weight percent structural units of a $C_1$-$C_8$ linear or branched alkyl acrylate monomer;
wherein the aqueous dispersion has a solids content in the range of from 15 to 60 weight percent; and wherein at least 50 weight percent of the film comprises one or more polymers, wherein at least 50 weight percent of the one or more polymers comprises structural units of the vinyl ester, vinyl alcohol, and the acrylate monomer.

The present invention is useful for preparing an article with oil and grease resistance, mineral oil barrier performance, and heat sealability.

DETAILED DESCRIPTION OF THE INVENTION

The present invention is a method comprising the steps of applying a composition onto a paper or paperboard substrate, then drying the composition to form a substrate superposed with a film having a dry coat weight in the range of from 1 $g/m^2$ to 20 $g/m^2$;
wherein the composition comprises an aqueous dispersion of copolymer particles comprising, based on the weight of the copolymer particles, a) from 40 to 96 weight percent structural units of a vinyl ester; b) from 2 to 50 weight percent structural units of vinyl alcohol; and c) from 0.5 to 30 weight percent structural units of a $C_1$-$C_8$ linear or branched alkyl acrylate monomer;
wherein the aqueous dispersion has a solids content in the range of from 15 to 60 weight percent; and wherein at least 50 weight percent of the film comprises one or more polymers, wherein at least 50 weight percent of the one or more polymers comprises structural units of the vinyl ester, vinyl alcohol, and the acrylate monomer.

As used herein, the term "structural units" of the named monomer refers to the remnant of the monomer after polymerization. For example, a structural unit of vinyl alcohol is as illustrated:

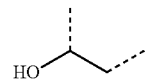

where the dotted lines represent the points of attachment of the structural unit to the polymer backbone.

The composition used to make the coated paper or paperboard substrate is advantageously prepared in two steps: In a first step, a vinyl ester and a $C_1$-$C_8$ linear or branched alkyl acrylate are copolymerized under emulsion polymerization conditions to form a dispersion of poly(vinyl ester-co-acrylate) copolymer particles; then the copolymer is partially hydrolyzed with a base to form a dispersion of polymer particles comprising structural units of the vinyl ester, vinyl alcohol, and the acrylate. Thus, a structural unit of vinyl alcohol need not require vinyl alcohol as a starting material.

Additional monomers may be used in the polymerization reaction including carboxylic acid monomers and sulfonic acid monomer or salts thereof. Examples of suitable carboxylic acid monomers include acrylic acid, methacrylic acid, fumaric acid, itaconic acid, crotonic acid, and maleic acid; examples of suitable sulfonic acid monomers include sulfoethyl acrylate, sulfoethyl methacrylate, sulfopropyl acrylate, sulfopropyl methacrylate, vinyl sulfonic acid, 2-acrylamido-2-methyl propanesulfonic acid, and 2-methacrylamido-2-methyl propanesulfonic acid, as well as salts thereof. The concentration of structural units of the carboxylic acid monomer is typically in the range of from 0.1 to 5 weight percent, based on the weight of the polymer particles; the concentration of structural units of the sulfonic acid monomer is also typically in the range of from 0.1 to 5 weight percent, based on the weight of the polymer particles.

Multiethylenically unsaturated monomers may also be used in the polymerization reaction, typically at a concentration in the range of from 0.1 to 5 weight percent, based on the weight of the monomers. Examples of suitable multiethylenically unsaturated monomers include allyl methacrylate, ethylene glycol dimethacrylate, diallyl maleate, and diallyl phthalate.

As used herein, the term "acrylate monomers" refers to acrylate or methacrylate monomers. Suitable $C_1$-$C_8$ linear or branched alkyl acrylate monomers (alkyl acrylate monomers) include methyl acrylate, methyl methacrylate, ethyl acrylate, n-butyl acrylate, n-butyl methacrylate, isobutyl acrylate, t-butyl acrylate, and 2-ethylhexyl acrylate.

Examples of vinyl esters include vinyl acetate, vinyl propionate, vinyl butyrate, vinyl octanoate, vinyl laurate, and vinyl versatate, with vinyl acetate being preferred. The concentration of structural units of the vinyl ester in the composition used to prepare the coated substrate is in the range of from 40 to 96 weight percent, based on the weight of the polymer particles; the concentration of structural units of vinyl alcohol is in the range of from 2, or from 5, or from 8 weight percent, to 50, or to 40 weight percent, based on the weight of the polymer particles. The concentration of structural units of the alkyl acrylate monomer is in the range of from 0.5, or from 1, to 30, or to 25 weight percent, but has been found to be optimal over a narrower range at higher concentrations of structural units of vinyl alcohol; more particularly, the concentration of structural units of the alkyl acrylate monomer is in the range of from 3, or from 4, to 20 weight percent when the concentration of structural units of vinyl alcohol is in the range of from 13, or from 20 weight percent, to 40 weight percent.

When the composition used to make the coated substrate is prepared by hydrolyzing a copolymer of the vinyl ester and the acrylate monomer under basic conditions, the composition further comprises a salt of a carboxylic acid, which is formed as a hydrolysis byproduct. The salt may be removed from the composition if desired. Where the vinyl ester is vinyl acetate, the composition may comprise an acetate anion at a concentration in the range of from 5 or from 8 weight percent, to 40 or to 35 weight percent, based on the weight of the acetate anion and the structural units of vinyl acetate, vinyl alcohol, the acrylate monomer. Sodium acetate, potassium acetate, and ammonium acetate are examples of salts of acetic acid, with sodium acetate being most common.

The composition used to prepare the coated substrate may include additional materials such as surfactants, binders, waxes, defoamers, dispersants, rheology modifiers, pigments, crosslinking agents, and colorants. Although it is possible to include an optical brightening agent in the composition used in the process of the present invention, it is best not to use such agents since the end use application for the prepared coated paper or paperboard is most commonly in the field of food packaging. The concentration of an optical brightening agent is therefore preferably less than 5 weight percent, more preferably less than 1 weight percent, and most preferably 0 weight percent, based on the weight of the composition.

The article of the present invention is advantageously prepared by applying the aqueous composition to a paper or paperboard substrate in a sufficient amount to achieve the desired coat weight, then drying the composition at an advanced temperature until the water is removed. The film comprises one or more polymers wherein at least 50, or at least 65, or at least 75, or at least 85, or at least 95 weight percent of the one or more polymers comprises a copolymer of the vinyl ester, vinyl alcohol, and the acrylate monomer, based on the weight of the film. The coating may comprise other polymers such as acrylic, styrene-butadiene, and styrene-acrylic polymers. Alternatively, the coating comprises from 60 or from 65 weight percent, to 95 or to 92 weight percent structural units of preferably vinyl acetate, vinyl alcohol, and the acrylate monomer and from 5 or from 8 weight percent, to 40 or to 30 weight percent of an acetate anion, based on the weight of the acetate anions an the structural units of preferably vinyl acetate, vinyl alcohol, and the acrylate monomer. The method of the present invention provides a coated paper or paperboard substrate with excellent oil and grease barrier resistance.

EXAMPLES

Intermediate Example 1—Preparation of a Vinyl Acetate-Butyl Acrylate Latex

Deionized water (783.0 g) was charged into a 5-L, 4-neck round bottom flask and heated to 60° C. under $N_2$. In a separate vessel, a monomer emulsion containing deionized water (451.0 g), sodium vinyl sulfonate (32.0 g, 25% in water), sodium acetate (4.0 g), TERGITOL™ 15-S-40 Surfactant (A Trademark of The Dow Chemical Company or its Affiliates, 22.9 g, 70% in water), Disponil FES 993 Emulsifier (106.6 g, 30% in water), glacial acrylic acid (8.0 g), butyl acrylate (32.0 g), and vinyl acetate (1552.0 g) was prepared. A portion of the monomer emulsion (44.2 g) was added to the reactor with rinsing (16.0 g water), followed by the addition of ammonium persulfate (1.5 g in 8.0 g water) with rinsing (8.0 g water) and then a solution of sodium bisulfite (0.3 g), ferrous sulfate heptahydrate (17 mg) and sodium dithionite (0.6 g) in 8.0 g water with rinsing (8.0 water). After a 2-min hold, the remainder of the monomer emulsion was fed into the reactor over 120 min. A solution of ammonium persulfate (4.9 g) and t-butyl hydroperoxide (2.0 g) in 120.0 g water, and a solution of sodium bisulfite (3.2 g in 120.0 g water) were simultaneously fed into the reactor over 130 min at temperature in the range of 64-66° C. Upon completion of all feeds and rinses, the reactor was cooled to 60° C. whereupon a solution of ammonium persulfate (0.5 g) and t-butyl hydroperoxide (1.7 g) in 48.0 g water, and a solution of sodium bisulfite (2.7 g in 48.0 g water) were simultaneously fed over 30 min. The reactor was then cooled to room temperature and ammonium hydroxide (6.9 g, 28 wt %) was added dropwise to raise the pH to 6.5-7.5. Solids content was found to be 48 wt. %.

Intermediate Example 2—Partial Hydrolysis of a Copolymer of Vinyl Acetate and Butyl Acrylate A portion of the latex of the Intermediate 1 latex (300 g, ~48% solids) was placed in a jar at room temperature, whereupon sodium hydroxide solution (10 wt % in water) was added dropwise to the stirred latex over 1 h to achieve the target hydrolysis level. The pH of the partially hydrolyzed latex was in the range of 9.0-10.0 and the solids was in the range of 27% and 46% depending on the degree of hydrolysis. The sample was stored at room temperature and the degree of hydrolysis was determined by HPLC analysis of the acetic acid generated via the cleavage of acetate group as described in the following section.

High Performance Liquid Chromatographic (HPLC) Analysis of Acetic Acid

HPLC analysis was performed using an Agilent 1100 Series HPLC equipped with a Phenomenex Rezex ROA Organic Acid H+ 240×4.6 mm column (8 µm particle size, 8% cross-linked sulfonated styrenedivinylbenzene), Phenomenex Carbo-H4 column guard, and UV detector operating at a wavelength of 210 nm. The hydrolyzed latex samples were diluted tenfold and centrifuged at 100,000 rpm for 15 min, after which time the supernatant was filtered through a 0.45 µm PVDF syringe filter. The sample injection volume was 5 µL and separations were performed with 2.5 mM phosphoric acid at a flow rate of 0.4 mL/min and a column temperature of 35° C. The instrument was externally calibrated from 50 to 10,000 ppm using acetic acid.

The stability of the hydrolyzed latexes was evaluated and illustrated in Table 1. The weight percentages of structural units of vinyl acetate (VA), butyl acrylate (BA), and vinyl alcohol are based on the weight of the polymer and the weight percent of the acetate anion (AcO⁻) are based on the weight of total solids of the hydrolyzed copolymer and the AcO⁻. Samples that remained unsolidified after 6 months passed the stability test, and samples that solidified within 3 months failed the test.

TABLE 1

Stability of Partially Hydrolyzed Polyvinyl Acetate Latexes

| Example | BA (wt %) | VA (wt %) | Vinyl alcohol (wt %) | AcO⁻ (wt %) | Stability |
|---|---|---|---|---|---|
| Comp. Ex. 1 | 0 | 87.7 | 11.2 | 13.1 | Fail |
| Comp. Ex 2 | 10 | 89 | 0 | 0 | Pass |
| Ex. 1 | 2.2 | 85.7 | 11.0 | 12.8 | Pass |
| Ex. 2 | 6.6 | 81.8 | 10.5 | 12.3 | Pass |
| Ex. 3 | 7.3 | 68.2 | 23.3 | 23.8 | Pass |
| Ex. 4 | 11.0 | 78.0 | 10.0 | 11.8 | Pass |
| Ex. 5 | 12.1 | 64.6 | 22.0 | 22.8 | Pass |
| Ex. 6 | 13.5 | 48.2 | 37.0 | 33.1 | Pass |
| Ex. 7 | 21.7 | 68.5 | 8.8 | 10.5 | Pass |

The data show the importance of inclusion of an acrylate to achieve latex colloidal stability.

Preparation of the Coated Substrate

Example 1 to 7 latexes were applied to UPM Brilliant Pro paper (basis weight: 62 g/m²) in the machine direction using an automated coater (K Control Coater) equipped with various wire wound rods to achieve dry coat weights of 5±0.3 g/m². Samples were dried at 100° C. for 2 min. The coated paper was conditioned in a temperature-controlled room for at least 1 h in accordance with TAPPI 402 standards.

3M Kit Test

Coated paper samples were tested for oil and grease resistance using TAPPI method T559-cm-12 with an extended range of kit scores. Kit solutions composed of castor oil, toluene, and heptane in varying ratios were applied dropwise to the coated substrate, allowed to sit for 15 s, then wiped away. Any occurrence of solvent breakthrough or substrate discoloration was classified as a failure for that Kit solution. The Kit score for a given sample was assigned using the number of the highest (most aggressive) Kit solution that passed on that coated substrate. In the TAPPI method, Kit scores range from 1 to 12 for the compositions of the Kit solutions. Additionally, more aggressive solutions were prepared to assign Kit values up to 16, as illustrated in Table 2 below. Each sample was tested in duplicate.

TABLE 2

Kit Testing

| Kit Value | Kit solution composition | | |
|---|---|---|---|
| | Wt % Castor Oil | Wt % Toluene | Wt % Heptane |
| 1 | 100.00 | 0.00 | 0.00 |
| 2 | 91.91 | 4.57 | 3.52 |
| 3 | 83.46 | 9.35 | 7.19 |
| 4 | 74.65 | 14.33 | 11.03 |
| 5 | 65.43 | 19.54 | 15.03 |
| 6 | 55.79 | 24.99 | 19.23 |
| 7 | 45.69 | 30.69 | 23.62 |
| 8 | 35.10 | 36.68 | 28.23 |
| 9 | 23.98 | 42.96 | 33.06 |
| 10 | 12.30 | 49.56 | 38.14 |
| 11 | 0.00 | 56.51 | 43.49 |
| 12 | 0.00 | 51.53 | 48.47 |
| 13 | 0.00 | 46.42 | 53.58 |
| 14 | 0.00 | 41.17 | 58.83 |
| 15 | 0.00 | 35.77 | 64.23 |
| 16 | 0.00 | 30.22 | 69.78 |

Hexane Vapor Transmission Rate (HVTR)

Coated paper samples were conditioned in a fume hood overnight before conducting the experiment. Coated paper substrates were cut into 2.5" circles. Reagent grade n-hexane (5 g) was placed into a permeability cup using a pipette. The sample was placed coating side down on top of the rubber gasket and the lid tightened to clamp the sample to the permeability cup. The initial mass of the permeability cup with sample attached was recorded, and the cups were weighed again after 24 h. To calculate the hexane vapor transmission rate, the weight after 24 h was subtracted from the initial weight and then divided by 0.000212 (area of exposed sample). The calculation provides a hexane vapor transmission rate in units of g/m² day.

Heat Sealability

The ability to heat seal the coated paper was evaluated using a single-phase Sentinel Laboratory Heat Sealer. Coated samples were cut to 2"×4" rectangles and placed coated side to coated side in the clamp of the heat sealer at a temperature of 190° C. and pressure of 100 psi for 0.5 s. After the substrate was cooled to room temperature, the two sheets were separated. Samples that separated with fiber tear were deemed a pass, while samples that separated without fiber tear were deemed a fail. Samples were tested in duplicate. Table 3 illustrates the barrier performance of the various coatings.

TABLE 3

Barrier Performance of Polyvinyl Acetate Latexes

| Example | Flat Kit | HVTR | Heat Seal |
|---|---|---|---|
| Comp. Ex 2 | 8 | 46 | Fail |
| Ex. 1 | 16 | 12 | Pass |
| Ex. 2 | 16 | 10 | Pass |
| Ex. 3 | 15 | 23 | Pass |
| Ex. 4 | 16 | 8 | Pass |
| Ex. 5 | 15 | 15 | Pass |
| Ex. 6 | 14 | 13 | Pass |
| Ex. 7 | 15 | 27 | Pass |

The data show improved oil and grease resistance, mineral oil barrier (lower HVTR), and heat sealability for coatings prepared from partially hydrolyzed copolymers, as compared to the coating prepared from a latex composition that was not partially hydrolyzed.

The invention claimed is:

1. A method comprising the steps of applying a composition onto a paper or paperboard substrate, then drying the composition to form a substrate superposed with a film having a dry coat weight in the range of from 1 g/m$^2$ to 20 g/m$^2$;
   wherein the composition comprises an aqueous dispersion of copolymer particles comprising, based on the weight of the copolymer particles, a) from 40 to 96 weight percent structural units of a vinyl ester; b) from 2 to 50 weight percent structural units of vinyl alcohol; and c) from 0.5 to 30 weight percent structural units of a $C_1$-$C_8$ linear or branched alkyl acrylate monomer;
   wherein the aqueous dispersion has a solids content in the range of from 15 to 60 weight percent; and wherein at least 50 weight percent of the film comprises one or more polymers, wherein at least 50 weight percent of the one or more polymers comprises structural units of the vinyl ester, vinyl alcohol, and the acrylate monomer.

2. The method of claim 1 wherein the $C_1$-$C_8$ linear or branched alkyl acrylate monomer is selected from the group consisting of methyl acrylate, methyl methacrylate, ethyl acrylate, n-butyl acrylate, n-butyl methacrylate, isobutyl acrylate, t-butyl acrylate, and 2-ethylhexyl acrylate; and the vinyl ester is vinyl acetate.

3. The method of claim 2 wherein the copolymer particles comprise, based on the weight of the copolymer particles, from 8 to 50 weight percent structural units of vinyl alcohol; and from 1 to 25 weight percent structural units of the $C_1$-$C_8$ linear or branched alkyl acrylate monomer.

4. The method of claim 3 wherein the $C_1$-$C_8$ linear or branched alkyl acrylate monomer is n-butyl acrylate.

5. The method of claim 2 wherein the concentration of structural units of the $C_1$-$C_8$ linear or branched alkyl acrylate monomer is in the range of from 3 to 20 weight percent when the concentration of structural units of vinyl alcohol is in the range of from 13 to 40 weight percent.

6. The method of claim 2 wherein the coating composition comprises a) from 60 to 95 weight percent of the structural units of vinyl acetate, vinyl alcohol, and the $C_1$-$C_8$ linear or branched alkyl acrylate monomer; and b) from 5 to 40 weight percent of an acetate anions; wherein the weight percent ranges are based on the weight of the acetate anions and the structural units of vinyl acetate, vinyl alcohol, and the $C_1$-$C_8$ linear or branched alkyl acrylate monomer.

7. The method of claim 6 wherein $C_1$-$C_8$ linear or branched alkyl acrylate monomer is n-butyl acrylate.

8. The method of claim 1 wherein at least 65 weight percent of the one or more polymers comprises structural units of vinyl acetate, vinyl alcohol, and the $C_1$-$C_8$ linear or branched alkyl acrylate monomer.

9. The method of claim 1 wherein the composition further comprises at least one additional material selected from the group consisting of surfactants, binders, defoamers, waxes, dispersants, rheology modifiers, pigments, crosslinking agents, and colorants; and less than 5 weight percent of an optical brightening agent, based on the weight of the composition.

10. The method of claim 1 wherein the composition further comprises less than 1 weight percent of an optical brightening agent, based on the weight of the polymer particles.

* * * * *